(12) United States Patent
Qi et al.

(10) Patent No.: US 8,086,549 B2
(45) Date of Patent: Dec. 27, 2011

(54) MULTI-LABEL ACTIVE LEARNING

(75) Inventors: Guo-Jun Qi, Beijing (CN); Xian-Sheng Hua, Beijing (CN); Yong Rui, Sammamish, WA (US); Hong-Jiang Zhang, Beijing (CN); Shipeng Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1043 days.

(21) Appl. No.: 11/958,050

(22) Filed: Dec. 17, 2007

(65) Prior Publication Data

US 2009/0125461 A1    May 14, 2009

Related U.S. Application Data

(60) Provisional application No. 60/986,881, filed on Nov. 9, 2007.

(51) Int. Cl.
G06F 15/18 (2006.01)

(52) U.S. Cl. ............................................. 706/14; 706/45

(58) Field of Classification Search .................... 706/20, 706/14, 45
See application file for complete search history.

(56) References Cited

U.S. PATENT DOCUMENTS

| | | | |
|---|---|---|---|
| 7,052,277 B2 | 5/2006 | Kellman | |
| 7,124,149 B2 * | 10/2006 | Smith et al. ........................... | 1/1 |
| 7,149,687 B1 | 12/2006 | Gorin et al. | |
| 7,158,970 B2 | 1/2007 | Chang | |
| 7,707,127 B2 * | 4/2010 | Jhala et al. ....................... | 706/16 |
| 7,860,818 B2 * | 12/2010 | Brinker et al. .................. | 706/50 |
| 2003/0233369 A1 | 12/2003 | Sassano | |
| 2004/0205482 A1 | 10/2004 | Basu et al. | |
| 2005/0071301 A1 | 3/2005 | Kuroiwa | |
| 2006/0190253 A1 | 8/2006 | Hakkani-Tur et al. | |
| 2007/0011127 A1 | 1/2007 | Yamashita et al. | |
| 2007/0094158 A1 | 4/2007 | Osoda et al. | |
| 2007/0150801 A1 | 6/2007 | Chidlovskii et al. | |

OTHER PUBLICATIONS

Cauwenberghs, Gert, and Tomaso Poggio. "Incremental and Decremental Support Vector Machine Learning." Neural Information Processing Systems. MIT Press, 2000. 409-415.*

Yuhong Guo and Russ Greiner. 2007. Optimistic active learning using mutual information. In Proceedings of the 20th international joint conference on Artificial intelligence (IJCAI'07), 823-829, Jan. 2007.*

A. McCallum, K. Nigam. Employing EM and pool-based active learning for text classification. In Proceedings of ICML-98, 15th International Conference on Machine Learning (1998), pp. 350-358.*

Nigam, Lafferty and McCallum. Using Maximum Entropy for Text Classification. In IJCAI-99 Workshop on Machine Learning for Information Filtering, 1999, pp. 61-67.*

Guo-Jun Qi, Xian-Sheng Hua, Yong Rui, Jinhui Tang, Tao Mei, and Hong-Jiang Zhang. 2007. Correlative multi-label video annotation. In Proceedings of the 15th international conference on Multimedia (Multimedia '07). ACM, New York, NY, USA, 17-26.*

(Continued)

Primary Examiner — Jeffrey A Gaffin
Assistant Examiner — David H Kim
(74) Attorney, Agent, or Firm — Lee & Hayes, PLLC (57) ABSTRACT

Multi-label active learning may entail training a classifier with a set of training samples having multiple labels per sample. In an example embodiment, a method includes accepting a set of training samples, with the set of training samples having multiple respective samples that are each respectively associated with multiple labels. The set of training samples is analyzed to select a sample-label pair responsive to at least one error parameter. The selected sample-label pair is then submitted to an oracle for labeling.

20 Claims, 7 Drawing Sheets

OTHER PUBLICATIONS

Guo-Jun Qi; Xian-Sheng Hua; Yong Rui; Jinhui Tang; Hong-Jiang Zhang; , "Two-Dimensional Active Learning for image classification," Computer Vision and Pattern Recognition, 2008. CVPR 2008. IEEE Conference on , vol., No., pp. 1-8, 23-28. Jun. 2008.*

Z H Zhou and K J Chen and Y Jiang. Exploiting unlabeled data in content-based image retrieval. In Proceedings of the European Conference on Machine Learning (ECML). 2004. pp. 425-435.*

Zhi-Hua Zhou, Ke-Jia Chen, and Hong-Bin Dai. 2006. Enhancing relevance feedback in image retrieval using unlabeled data. ACM Trans. Inf. Syst. 24, 2 (Apr. 2006), 219-244.*

Rong Yan; Hauptmann, A.; , "Multi-class active learning for video semantic feature extraction," Multimedia and Expo, 2004. ICME '04. 2004 IEEE International Conference on , vol. 1, No., pp. 69-72 vol. 1, Jun. 27-30, 2004.*

Brinker, "Active Learning with Kernel Machines," Dissertation in Computer Science, Paderborn, Nov. 2004, pp. 1-176.

Li, et al., "Multi-Label SVM Active Learning for Image Classification", available at least as early as Nov. 2, 2007, at http://users.rsise.anu.edu.au/~wanglei/My_papers/Multilabel_SVM_Active_ICIP04.pdf>>, pp. 4.

Roy, Toward Optimal Active Learning through Sampling Estimation of Error Reduction, available at least as early as Nov. 2, 2007, at <<http://www-connex.lip6.fr/~amini/RelatedWorks/Roy01.pdf>>, pp. 8.

Shen, et al., "Multi-Label Machine Learning and its Application to Semantic Scene Classification", available at least as early as Nov. 2, 2007, at <<http://www.cs.wm.edu/~xshen/Publications/ei5307-22.pdf>>, pp. 12.

Zhu, et al., "Multilabelled Classification Using Maximum Entropy Method", at <<http://192.5.53.208/u/zsh/pub/f269-zhu.pdf>>, ACM, 2005, pp. 8.

* cited by examiner

Example Multi-Label Active Learning Method

MULTI-LABEL ACTIVE LEARNING

CROSS-REFERENCE(S) TO RELATED APPLICATION(S)

This U.S. Nonprovisional Patent Application claims the benefit of copending U.S. Provisional Patent Application No. 60/986,881, filed on 9 Nov. 2007 and entitled "Multi-Label Active Learning". U.S. Provisional Patent Application No. 60/986,881 is hereby incorporated by reference in its entirety herein.

BACKGROUND

Many tasks today are performed faster or more efficiently with a computing machine. Before the computing machine can perform a given task, however, it is first taught how to do so. One task that machines can perform, after sufficient learning, is categorizing objects in accordance with one or more potential labels. To categorize an object, the object is input to a machine having a classification function, and the machine outputs a label for the object.

Supervised learning is a machine learning technique for creating a classification function from training data. Training data typically includes multiple sample objects with labels that are already categorized. After training with the labeled samples, the machine can accept a new object and produce a label for the new object without user interaction.

Creating the training data, on the other hand, does entail user interaction. In fact, significant and expensive human interaction may be required to create the training data, especially if the set of sample objects is extensive. To decrease this time and expense, active learning may be employed. Active learning is traditionally a technique in which an algorithm requests that a human manually label a subset of the training data samples. An active learning algorithm can carefully select which samples are to be labeled so that the total number of samples that need to be labeled in order to adequately train the machine is decreased.

The reduced labeling effort can therefore save significant time and expense as compared to labeling all of the possible training samples. Moreover, a quality active learner can judiciously select which subset of samples is to be labeled such that the classification function of the machine is not significantly compromised. Unfortunately, achieving such a judicious active learning algorithm is challenging, especially when using training samples that have multiple labels per sample.

SUMMARY

Multi-label active learning may entail training a classifier with a set of training samples having multiple labels per sample. In an example embodiment, a method includes accepting a set of training samples, with the set of training samples having multiple respective samples that are each respectively associated with multiple labels. The set of training samples is analyzed to select a sample-label pair responsive to at least one error parameter. The selected sample-label pair is then submitted to an oracle for labeling.

In another example embodiment, a method further includes receiving from the oracle a relevancy indication for the selected sample-label pair. The relevancy indication is added to the set of training samples at the selected sample-label pair to update the set of training samples. The classifier is updated using the updated set of training samples. In yet another example embodiment, the at least one error parameter may be a generalization or classification error parameter that is capable of being reduced based on mutual information among the multiple labels.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, apparatus, device, media, procedure, API, arrangement, etc. embodiments are described herein.

BRIEF DESCRIPTION OF THE DRAWINGS

The same numbers are used throughout the drawings to reference like and/or corresponding aspects, features, and components.

DETAILED DESCRIPTION

1: Introduction to Multi-Label Active Learning

Conventional active learning methods are directed to samples with a single label per sample. Such active learning methods iteratively annotate a set of elaborately selected samples so that the generalization error is minimized with each iteration. Active learning is traditionally aimed at selecting a set of most, or at least relatively more, informative training samples so that the statistical classification models can be efficiently trained with a smaller training set while still preserving an expected level of performance for the classifier. Existing strategies for sample selection in active learning mainly focus on the binary classification scenario.

However, in many real-world applications such as text search, image retrieval, and bioinformatics, a sample is usually associated with multiple concepts rather than a single one. Under such a multi-label setting, each sample is manually annotated by an oracle with a "positive" or "negative" label for each concept. For example, given an image to be annotated and four concepts, the annotating oracle (e.g., one or more human observers) separately judges if each of the four concepts can be assigned to the given image. For instance, a human may determine if each of Beach, Field, Mountain, and Urban is relevant to the given image. As a result of the additional human interaction, active learning with multi-labeled samples is often much more time-consuming than with single-labeled samples, especially when the number of labels per sample is large.

A straight-forward approach for tackling active learning in a multi-label setting is to translate it into a set of binary problems. In other words, each labeling concept may be independently handled by a binary-based active learning algorithm. However, such a relatively naïve solution does not take the rich correlations among multiple labels into consideration. These rich correlations have a great potential to improve the efficiency of active learning algorithms.

Thus, for active learning in multi-label settings, not only can the samples be appropriately selected for labeling, but the label set to be manually annotated by an oracle for a particular selected sample may also be appropriately selected. Selecting labels for annotation from among multiple potential labels may be pertinent because the varying contribution levels of different labels to the minimization of the generalization error may be different due to the existence of label correlations.

In a general example embodiment, partial labels (i.e., fewer than all of the potential labels) for a specific sample may be selected to be annotated while other ones can be inferred by exploiting the label correlations. Consequently, the human labor involved with active learning in a multi-label environment can be significantly reduced because all of the labels that are associated with a given sample need not be annotated. To this end, examples of efficient multi-label active learning strategies are described herein.

In a specific example embodiment, a step-by-step procedure entails selecting sample-label pairs, instead of only samples as in conventional active learning approaches, to minimize a derived Multi-Label Bayesian Classification Error Bound. Also, an example Bayesian classifier, which utilizes a Kernelized Maximum Entropy Model (KMEM), is described as an active learner. This Bayesian classifier is able to model the correlations among labels. Furthermore, an example Expectation Maximization (EM)-based parameter estimation algorithm is described to handle the incomplete labels resulting from the aforementioned partial labeling.

In another example embodiment, an active learning strategy as described herein iteratively selects sample-label pairs to minimize, or at least reduce, the expected classification error. For instance, with each iteration, the annotating oracle may be asked to annotate or confirm a selected portion of the potential labels while the remaining unlabeled categories are inferred according to the label correlations. Versions of this algorithmic strategy are termed herein Active Sampling and Labeling (ASL).

An intuitive explanation of an example embodiment for this ASL strategy is as follows: There exists both sample and label redundancy for multi-labeled samples. Annotating a set of selected sample-label pairs can therefore provide sufficient information for training a classifier because the information in the selected sample-label pairs can be propagated to the remaining pairs along both sample and label "dimensions". Thus, unlike traditional binary-based active learning strategies that only take the sample redundancy into account when selecting samples, example ASL embodiments as described herein additionally consider the label dimension to leverage the rich dependencies and other redundancies embedded in multiple labels.

Certain embodiments of ASL are to efficiently select an optimal, or at least relatively more informative, portion of the labels instead of all of the labels for a particular sample. This strategy can significantly reduce the human labors involved with active learning. By way of example, Field and Mountain labels tend to be relevant simultaneously to an image. It can therefore be reasonable to select one of the two concepts for annotation while omitting the other because the uncertainty of the other can be appreciably decreased after annotating the selected one. Another example is provided by Mountain and Urban labels. In contrast to Field and Mountain, these two concepts often do not occur together. Thus, positively annotating one of them most likely eliminates the existence of the other.

Two relevant issues are addressed herein for implementing an example ASL embodiment. First, an example selection strategy is described for finding appropriate sample-label pairs for annotation. To handle this first issue, the selection of sample-label pairs is performed by minimizing, or at least reducing, a derived Multi-Label Bayesian Classification Error Bound. Selecting sample-label pairs under this paradigm can efficiently reduce both the sample and the label uncertainty.

Second, an example approach is described for modeling the label correlations for a classifier. Because versions of the ASL strategy utilize the label dependencies to reduce label annotation labors, the corresponding classifier is also to model the label correlations. In example embodiments, this second issue is handled with implementations of a Kernelized Maximum Entropy Model (KMEM), which is capable of modeling such correlations. Furthermore, because embodiments of the ASL strategy omit annotating a portion of the labels for at least some of the samples, the label information for training the KMEM is incomplete. An Expectation-Maximization (EM) algorithm is also adopted in example embodiments to handle this issue.

Other general and specific example embodiments are described herein below. Although certain example aspects may be described in a specific context of hardware or software, such description is by way of example only. In other words, the example embodiments described herein may be implemented fully or partially in hardware, software, firmware, fixed logic circuitry, combinations thereof, and so forth.

2: Example Embodiments for Active Sampling and Labeling (ASL)

Figure 1:
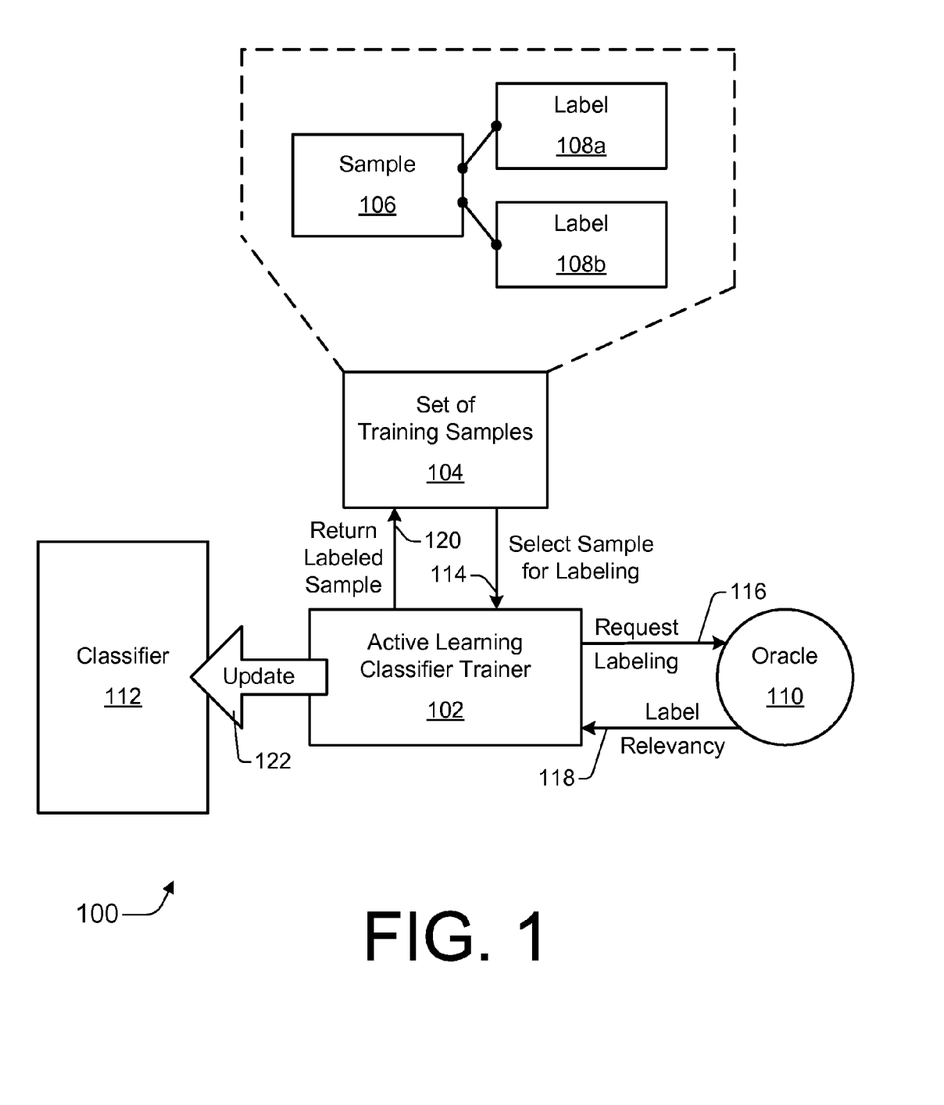
FIG. 1 is a block diagram that illustrates an example general scenario for multi-label active learning with an active learning classifier trainer and a related classifier.

FIG. 1 is a block diagram that illustrates an example general scenario 100 for multi-label active learning with an active learning classifier trainer and a related classifier. As illustrated, multi-label active learning scenario 100 includes an active learning classifier trainer 102, a set of training samples 104, an oracle 110, and a classifier 112. Training samples set 104 includes at least one sample 106. Each sample 106 is associated with two or more labels 108 in a multi-label active learning scenario.

Samples 106 may correspond to text items, images, videos, biological data, combinations thereof, or any other type of data set. Although a single sample 106 that is associated with two labels 108a and 108b is explicitly shown, there may be many (e.g., dozens, hundreds, thousands, or more of) such samples 106. Also, each sample 106 may be associated with any number of labels 108. During the process to train classifier 112, each label 108 may be in a labeled or an unlabeled state.

In operation for an example embodiment, active learning classifier trainer 102 selects from training samples set 104 a sample 106 for labeling at arrow 114. The sample selection may be based on one or more criteria. As described further herein below, this sample selection may include selecting a sample 106-label 108 pair for labeling. Active learning classifier trainer 102 submits the selected sample to oracle 110 to request that the sample be labeled at arrow 116.

Oracle 110 may also be termed a teacher, an annotator, and so forth. Oracle 110 is typically a human or a group of humans that is capable of labeling each sample. The labeling may indicate, for example, a relevancy of label 108 to its associated sample 106. If two labeling categories are permitted for each label concept, the relevancies may be positive/negative, relevant/not relevant, related/not related, and so forth. Alternatively, the relevancy labeling may be part of a scale having more than two categories (e.g., not relevant, slightly relevant, fairly relevant, and very relevant). Oracle 110 provides or inputs the labeled relevancy at arrow 118 to active learning classifier trainer 102.

At arrow 120, active learning classifier trainer 102 returns the labeled sample having the newly-categorized label to the set of training samples 104 at the selected sample 106-label 108 pair to update the set of training samples 104. Using the additional labeling of the updated training samples set 104, classifier 112 is updated at arrow 122. The process can thus include sample selection 114, oracle labeling 116/118, training sample set updating 120, and classifier updating 122. The process may be iterated until a desired criterion is reached. This criterion may be, for example, a predetermined number of iterations, a convergence of expected/estimated error performance, a number of labels that can be submitted to and returned from oracle 110, some combination thereof, and so forth.

After training, classifier 112 may be given an input sample object from a target data set. In response, classifier 112 outputs one or more predicted labeled concepts in accordance with its trained classifying algorithm. Classifier 112 may employ any classifying algorithm. Example general classifying algorithms include, but are not limited to, Neural Network Multi-layer Perception), Support Vector Machines (SVM), k-Nearest Neighbors, Gaussian Mixture Model, Gaussian, Naive Bayes, Decision Tree, RBF classifiers, combinations thereof, and so forth. An example classifying algorithm that is tailored to support multi-label active learning is described herein below in Section 3.

Active learning classifier trainer 102, set of training samples 104, and classifier 112 may comprise processor-executable instructions. By way of example, active learning classifier trainer 102 and classifier 112 may be software realized on processor-accessible media. Also, training samples set 104 may be a data structure realized on processor-accessible media. Although illustrated as separate blocks, the processor-executable instructions may be implemented jointly. For instance, the functionality of active learning classifier trainer 102 and classifier 112 may be combined into one set of processor-executable instructions (e.g., multi-label active learning system 600 of FIG. 6).

Figure 2:
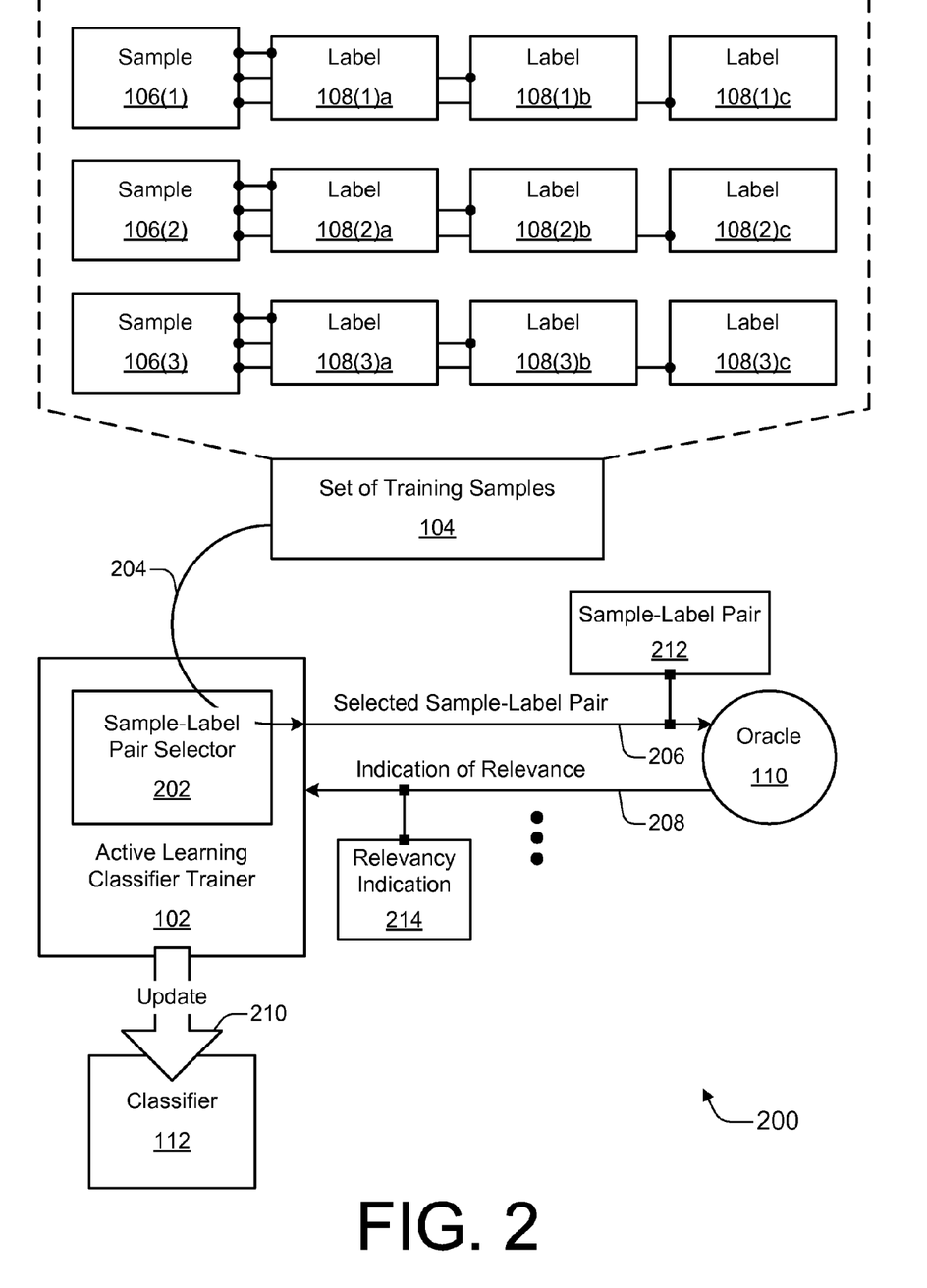
FIG. 2 is a block diagram that illustrates an example scenario for multi-label active learning in which sample-label pairs are selected for labeling.

FIG. 2 is a block diagram that illustrates an example scenario 200 for multi-label active learning in which sample-label pairs 212 are selected for labeling. As illustrated, multi-label active learning scenario 200 includes active learning classifier trainer 102, set of training samples 104, oracle 110, and classifier 112. Active learning classifier trainer 102 includes a sample-label pair selector 202.

Generally, each respective sample $106(x)$ is associated with multiple labels $108(x)$. Training samples set 104 may include any number of samples 106, each of which may have any number of associated labels 108. As illustrated in FIG. 2, however, there are three samples 106(1)-106(3), each of which has three labels 108a-108c. Specifically, a sample 106(1) is associated with label 108(1)a, label 108(1)b, and label 108(1)c. A sample 106(2) is associated with label 108(2)a, label 108(2)b, and label 108(2)c. A sample 106(3) is associated with label 108(3)a, label 108(3)b, and label 108(3)c. It should be understood that different samples 106 may alternatively be associated with different numbers of labels 108 within a single set of training samples 104.

In operation of an example embodiment, sample-label pair selector 202 selects at arrow 204 a sample $106(x)$ and an associated label $108(x)$ to jointly form a sample-label pair 212 for labeling by oracle 110. This sample-label pair selection may be made responsive to an error parameter, such as a generalization or classification error parameter. For instance, it may be made responsive to an error bound. By way of example, a sample-label pair may be selected responsive to a Bayesian classification error bound for a multi-label scenario. More specifically, a sample-label pair may be selected so as to reduce, if not minimize, an expected Bayesian error. As described herein below in Section 2.2 with particular reference to formulation (3), the sample-label pair selection may be effectuated by maximizing the entropy of the selected sample-label pair and by maximizing the mutual information between the selected label and the other labels that are also associated with the selected sample.

After sample-label pair selector 202 has selected a sample-label pair 212, active learning classifier trainer 102 submits the selected sample-label pair 212 to oracle 110 at arrow 206 for labeling. At arrow 208, oracle 110 returns an indication of relevance 214 of the submitted label 108 to its associated sample 106. This indicated relevancy labeling 214 is incorporated into the set of training samples 104 to update it. With the updated training samples set 104, active learning classifier trainer 102 updates classifier 112 at arrow 210.

The following describes an example operation. Sample-label pair selector 202 may consider each of the samples 106 and associated labels 108 of training samples set 104. From these variables, a sample-label pair 212 is selected at arrow 204 so as to minimize, or at least reduce, an expected Bayesian error Assume that the selected sample-label pair 212 is sample 106(2) and label 108(2)b. It should be noted that one or more other labels 108(2)a,c that are associated with sample 106(2) can be excluded from this selection (at least during a single individual iteration). The selected sample-label pair 212 is submitted to oracle 110 at arrow 206. Active learning classifier trainer 102 requests that oracle 110 indicate the relevance of label 108(2)b to its associated sample 106(2). After relevancy indication 214 is returned from oracle 110 at arrow 208, active learning classifier trainer 102 can update the set of training samples 104. With the updated training samples set 104, active learning classifier trainer 102 can update classifier 112 at arrow 210.

In Section 2.1 below, the dual dimensionality along both sample and label dimensions of an example ASL embodiment in a multi-label setting is described with reference to FIG. 3. In Section 2.2, a Bayesian error bound is derived that gives the expected classification error given a selected sample-label pair. Also in Section 2.2, an ASL strategy for an example embodiment is deduced by selecting the sample-label pairs responsive to this bound.

2.1: Example ASL Strategy

Traditional active learning algorithms employ a one-dimensional active selection approach, which only reduces the sample uncertainty. Yet multi-label classifiers have uncertainty among different labels as well as different samples. In contrast to traditional binary active learning approaches that select the most informative samples for annotation, ASL embodiments as described herein jointly select both the samples and the labels. Different labels of a certain sample have different contributions to minimizing the expected classification error of the to-be-trained classifier. Thus, annotating a well-selected portion of the labels may provide sufficient information for learning the classifier. This ASL strategy trades off between the annotation labors and the learning performance along two dimensions—the sample and the label dimensions.

Figure 3:
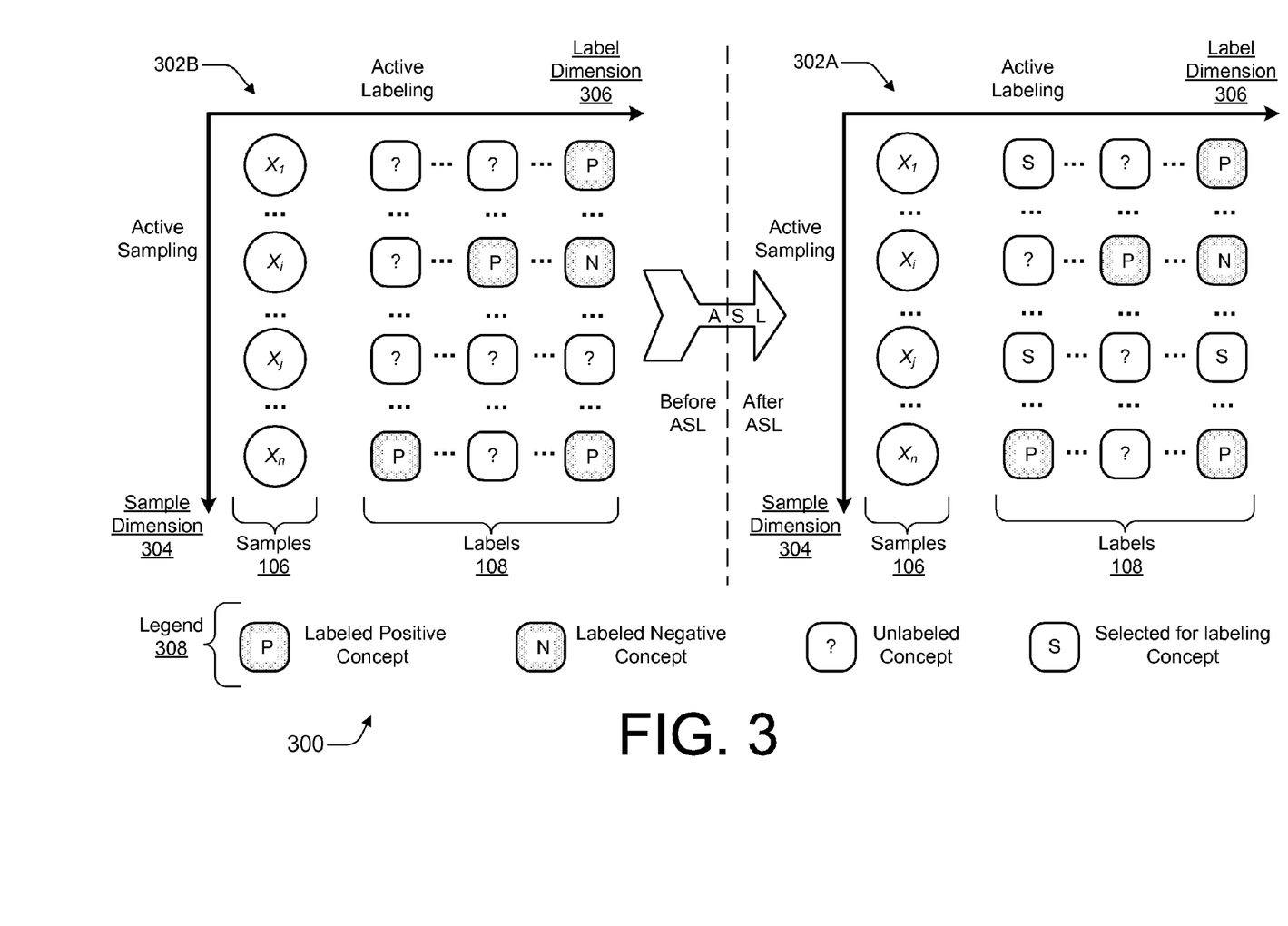
FIG. 3 is a block diagram that illustrates an example of active sampling and labeling (ASL) that addresses a set of training samples along both a sample dimension and a label dimension.

FIG. 3 is a block diagram that illustrates an example of active sampling and labeling (ASL) 300 that addresses a set of training samples along both a sample dimension 304 and a label dimension 306. FIG. 3 illustrates two matrices 302A and 302B. Matrix 302B represents a set of training samples 106 with associated labels 108 before ASL is implemented, and matrix 302A represents them after ASL is implemented. Each matrix 302 is organized along two dimensions: a label dimension 306 and a sample dimension 304. Active labeling is performed along label dimension 306, and active sampling is performed along sample dimension 304.

Samples 106 are illustrated as circles and identified by the variable "X", $X_1 \ldots X_i \ldots X_j \ldots X_n$. Labels 108 are illustrated as squares with rounded corners. As indicated by legend 308, each label may be categorized or labeled as a positive concept ("P"), as a negative concept ("N"), as an unlabeled concept ("?"), or it may be selected for labeling of the concept ("S"). As indicated by the ellipses (" . . . ") in each matrix 302, more samples 106 and labels 108 than those that are explicitly illustrated may be present.

The illustrated example labeling states for matrices 302B and 302A are as follows. For the before ASL matrix 302B, sample $X_1$ has three associated labels that are: ?, ?, and P. Sample $X_i$ has three associated labels that are: ?, P, and N. Sample $X_j$ has three associated labels that are: ?, ?, and ?. Sample $X_n$ has three associated labels that are: P, ?, and P. For the after ASL matrix 302A, sample $X_1$ has three associated labels that are: S, ?, and P. Sample $X_i$ has three associated labels that are: ?, P, and N. S ample $X_j$ has three associated labels that are: S, ?, and S. Sample $X_n$ has three associated labels that are: P, ?, and P. Thus, example ASL procedure 300 has selected three sample-label pairs for labeling. These three sample-label pairs include one with sample $X_1$ and two with sample $X_j$.

ASL 300 is therefore a two-dimensional active learning strategy, which reduces the uncertainty along the dimensionalities of both samples and labels. More specifically, it is recognized that along the label dimension the labels correlatively interact. Consequently, once at least a portion of the labels are annotated, the remaining unlabeled concepts can be inferred based on the label correlations. This approach can save significant labor as compared to fully annotating all of the multiple labels. Its efficiency is increased all the more when the number of labels is extraordinarily large. For instance, an image may be associated with hundreds, thousands, or even more concepts that can be labeled. Manually labeling each and every potential concept would incur large labor costs for even just one such image. Hence, because ASL 300 selects the more, if not most, informative labels for annotation, it can save significant labor costs.

Figure 4:
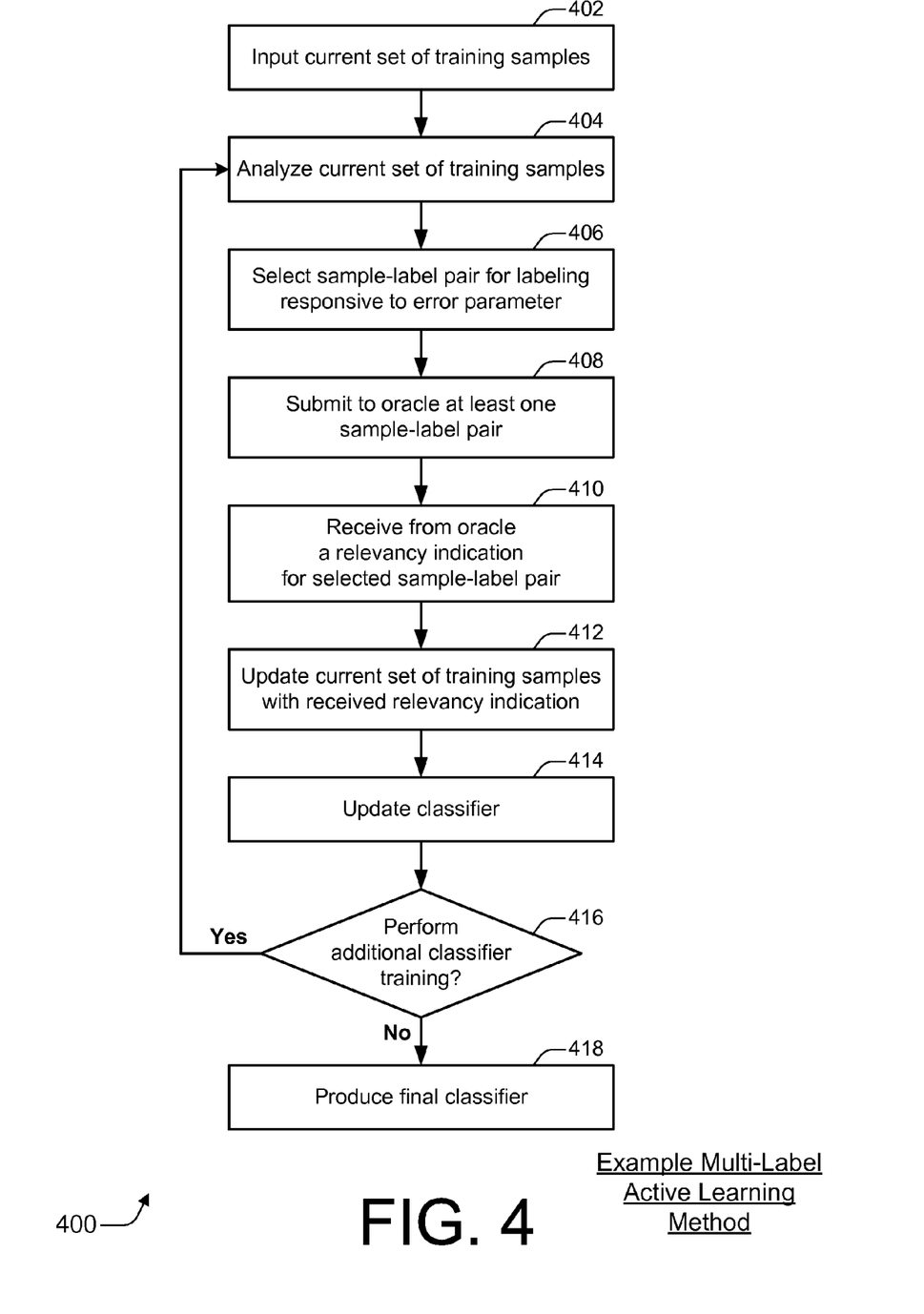
FIG. 4 is a flow diagram that illustrates an example of a method for multi-label active learning.

FIG. 4 is a flow diagram 400 that illustrates an example of a method for multi-label active learning. Embodiments of flow diagram 400 may be realized, for example, as processor-executable instructions. Processor-executable instructions may be embodied as software, firmware, hardware, fixed logic circuitry, some combination thereof, and so forth. The acts of the described flow diagram(s) may be performed in many different environments, with a number of different devices, and/or in conjunction with a variety of different classification algorithms. The order in which flow diagrams are described herein is not intended to be construed as a limitation, and any number of the described blocks can be combined, augmented, rearranged, and/or omitted to implement a respective method, or an alternative method that is equivalent thereto.

Flow diagram 400 includes nine blocks 402-418. By way of example, the description of flow diagram 400 includes references to other figures, such as FIGS. 1, 2, and 3. In an example embodiment of flow diagram 400, at block 402, a current set of training samples is input to and accepted by the system. For example, a set of training samples 104 may be input to active learning classifier trainer 102, with set of training samples 104 including multiple respective samples 106 that are each respectively associated with multiple labels 108.

At block 404, a current set of training samples is analyzed. For example, the current state of training samples set 104, which is likely partially but not fully labeled, may be analyzed. At block 406, a sample-label pair is selected for labeling responsive to at least one error parameter. For example, a sample-label pair 212 having a sample 106(3) and associated label 108(3)c may be selected for labeling responsive to an error parameter, such as a generalization or classification error parameter. The other labels 108(3) that are associated with sample 106(3) may be labeled or unlabeled. If unlabeled, they may remain unlabeled or may be subsequently requested for labeling.

At block 408, at least one selected sample-label pair is submitted to an oracle. For example, sample 106(3) and label 108(3)c of sample-label pair 212 may be submitted to oracle 110. At block 410, a relevancy indication for the selected sample-label pair may be received from the oracle. For example, a positive or negative indication of the conceptual relevancy 214 of label 108(3)c to sample 106(3) may be received from oracle 110.

At block 412, the current set of training samples is updated with the received relevancy indication. For example, active learning classifier trainer 102 may add the positive/negative relevancy indication 214 at label 108(3)c of associated sample 106(3) in set of training samples 104. At block 414, the classifier is updated. For example, a classification algorithm of classifier 112 may be updated using the updated training samples set 104.

At block 416, it is determined if additional classifier training is to be performed. For example, this determination may be made with reference to one or more criteria. If more training is to be performed ("Yes" branch), the method of flow diagram 400 continues at block 404. If no more training is to be performed ("No" branch), then at block 418, the final classifier is produced. Classifier 112 may then be used to label new objects.

By way of example, the error parameter (of block 406) may be a generalization or classification error, such as Bayesian error bound that is described herein below. The error parameter may be reduced, including minimized. For instance, the Bayesian error bound may be minimized to select the sample-label pair. As described below in Section 2.2 with reference to formulation (3), the bound may be minimized by maximizing the mutual information between a selected label of a selected sample and the labels that are associated with the selected sample. Furthermore, the parameter bound may be separated into an entropy portion that involves the selected label and a mutual information portion that excludes the selected label.

In the following Section 2.2, a two-dimensional selection criterion based on a derived Bayesian classification error bound for multi-label settings is described. It should be noted that as illustrated in FIG. 3, during the learning process, some samples may lack some labels because a portion of the labels remain un-annotated. This differs from traditional active learning algorithms. In Section 3.2 below, a strategy for training the classification model from incomplete labels is described.

2.2: Example Error Bound for ASL Selection

For an example embodiment, the ASL learner requests label annotations on the basis of sample-label pairs which, once incorporated into the training set, are expected to result in the lowest generalization error. A Multi-Labeled Bayesian Error Bound is derived with a selected sample-label pair under a multi-label setting, and ASL accordingly selects the optimal pairs to minimize this bound.

The following notations are utilized herein. For each sample x, it has m labels $y_i (1 \leq i \leq m)$ Each label indicates whether its corresponding concept occurs. In each ASL iteration, some of these labels have already been annotated while others have not. Let $U(x)=\{i|(x,y_i) \text{ is unlabeled}\}$ denote the set of indices of the unlabeled part, and $L(x)=\{i|(x,y_i) \text{ is labeled}\}$ denote the labeled part. It should be noted that $L(x)$ can be the empty set $\emptyset$ when no label has yet been annotated for sample x. Let $P(y|x)$ be the unknown conditional distribution over the samples, where $y=\{0, 1\}^m$ is the complete label vector and $P(x)$ is the marginal sample distribution.

First, the establishment of a Bayesian error bound is described. The error bound is for classifying one unlabeled $y_i$ once $y_s$ is actively selected for annotating.

Lemma 1: Given is a sample x and its unlabeled and labeled parts $U(x)$ and $L(x)$. Once $y_s$ is tentatively selected to be requested for labeling (but not yet annotated by the oracle), the Bayesian classification error $E(y_i|y_s,y_{L(x)},x)$ for an unlabeled $y_i$, $i \in U(x)$ is bounded as given below by formulation (1):

$$E(y_i \mid y_s; y_{L(x)}, x) \leq \frac{1}{2} H(y_i \mid y_s; y_{L(x)}, x) = \frac{\sum_{t,r \in [0,1]} -P(y_i = t, y_s = r \mid y_{L(x)}, x) \log P(y_i = t \mid y_s = r; y_{L(x)}, x)}{2} \quad (1)$$

where $H(y_i|y_s; y_{L(x)},x)$ is the conditional entropy of $y_i$ given the selected part $y_s$ (both $y_i$ and $y_s$ are random variables because they have not yet been labeled) and $y_{L(x)}$ is the known labeled part.

Proof of Lemma 1: Because the selected $y_s$ can take on two values $\{0, 1\}$, there are two possible posterior distributions for the unlabeled $y_i$, $P(y_i|y_s=1;y_{L(x)},x)$ and $P(y_i|y_s=0;y_{L(x)},x)$ If $y_s=1$ holds, the Bayesian classification error is as follows:

$$E(y_i|y_s=1;y_{L(x)},x)=\min\{P(y_i=1|y_s=1;y_{L(x)},x),P(y_i=0|y_s=1;y_{L(x)},x)\}.$$

Given the inequality $$\min\{p, 1-p\} \leq \frac{1}{2}H(p),$$

the Bayesian classification error can be rewritten as follows:

$$E(y_i \mid y_s = 1; y_{L(x)}, x) \leq \frac{1}{2} H(y_i \mid y_s = 1; y_{L(x)}, x).$$

Similarly, if $y_s=0$ holds, $$E(y_i \mid y_s = 0; y_{L(x)}, x) \leq \frac{1}{2} H(y_i \mid y_s = 0; y_{L(x)}, x).$$

Hence, the Bayesian classification error bound given the selected sample $y_s$ can be computed as follows:

$$E(y_i \mid y_s; y_{L(x)}, x) = P(y_s = 1 \mid y_{L(x)}, x) E(y_i \mid y_s = 1; y_{L(x)}, x) +$$
$$P(y_s = 0 \mid y_{L(x)}, x) E(y_i \mid y_s = 0; y_{L(x)}, x) \leq$$
$$\frac{1}{2} P(y_s = 1 \mid y_{L(x)}, x) H(y_i \mid y_s = 1; y_{L(x)}, x) +$$
$$\frac{1}{2} P(y_s = 0 \mid y_{L(x)}, x) H(y_i \mid y_s = 0; y_{L(x)}, x) = \frac{1}{2} H(y_i \mid y_s; y_{L(x)}, x)$$

The last equality derives from the definition of conditional entropy.

It should be noted that that this bound is irrelevant to the true label of the selected sample $y_s$. In fact, before the annotating oracle provides the annotation of $y_s$, the true value of $y_s$ is unknown. However, regardless of what $y_s$ is categorized to, 1 or 0, this error bound still holds.

Based on Lemma 1, the following theorem, which bounds the multi-label error, can be obtained:

Theorem 1: (Multi-labeled Bayesian classification error bound). Under the condition of Lemma 1, the Bayesian classification error bound $E(y|y_s; y_{L(x)},x)$ for sample x over the label vector y is as follows:

$$E(y \mid y_s; y_{L(x)}, x) \leq \frac{1}{2} - \frac{1}{2m} \sum_{i=1}^{m} MI(y_i; y_s \mid y_{L(x)}, x)$$

where $MI(y_i;y_s|y_{L(x)},x)$ is the Mutual Information between the random variables $y_i$ and $y_s$ given the known labeled part $y_{L(x)}$.

Proof of Theorem 1: The derivation follows:

$$E(y \mid y_s; y_{L(x)}, x) \stackrel{(1)}{=} \frac{1}{m} \sum_{i=1}^{m} E(y_i \mid y_s; y_{L(x)}, x) \stackrel{(2)}{\leq}$$
$$\frac{1}{2m} \sum_{i=1}^{m} H(y_i \mid y_s; y_{L(x)}, x)$$
$$\stackrel{(3)}{=} \frac{1}{2m} \sum_{i=1}^{m} \{H(y_i \mid y_{L(x)}, x) - MI(y_i; y_s \mid y_{L(x)}, x)\} \stackrel{(4)}{\leq}$$
$$\frac{1}{2m} \sum_{i=1}^{m} \{1 - MI(y_i; y_s \mid y_{L(x)}, x)\}$$
$$\stackrel{(5)}{=} \frac{1}{2} - \frac{1}{2m} \sum_{i=1}^{m} MI(y_i; y_s \mid y_{L(x)}, x)$$

where (2) directly comes from Lemma 1; (3) makes use of the relationship between mutual information and entropy: $MI(X;Y) H(X)-H(X|Y)$; and (4) follows the conclusion that the entropy of a binary valued random variable is no more than 1.

In an example embodiment, ASL is implemented in the context of pool-based active learning. In other words, a large pool P is available to the trainer as sampled from $P(x)$, and the ASL algorithm then selects the most informative sample-label pairs from the pool. Given the above Theorem 1, the expected Bayesian classification error over the samples in P when selecting a sample-label pair $(x_s, y_s)$ for labeling can be written as:

$$E(P) = \frac{1}{|P|}\left\{E(y \mid y_s; y_{L(x)}, x_s) + \sum_{x \in P \setminus x_s} E(y \mid y_{L(x)}, x)\right\}$$

$$= \frac{1}{|P|}\left\{E(y \mid y_s; y_{L(x)}, x_s) - E(y \mid y_{L(x)}, x_s) + \sum_{x \in P} E(y \mid y_{L(x)}, x)\right\}$$

The above classification error on the pool can be used to estimate the expected error over the full distribution $P(x)$ because the pool not only provides a finite set of sample-label pairs but also an estimation of $P(x)$. Thus, a goal is to select a best sample-label pair $(x_s^*, y_s^*)$ so as to minimize the above-identified expected error. This can be rewritten as:

$$(x_s^*, y_s^*) = \operatorname{argmin}_{x_s \in P, y_s \in U(x_s)} E(P)$$

$$= \operatorname{argmin}_{x_s \in P, y_s \in U(x_s)} \{E(y \mid y_s; y_{L(x)}, x_s) - E(y \mid y_{L(x)}, x_s)\}$$

Applying the conclusion in Theorem 1, the following formulation (2) can be derived:

$$E(y \mid y_x; y_{L(x)}, x_s) - E(y \mid y_{L(x)}, x_s) \leq \quad (2)$$

$$E(y \mid y_s; y_{L(x)}, x_s) \leq \frac{1}{2} - \frac{1}{2m}\sum_{i=1}^{m} MI(y_i; y_s \mid y_{L(x)}, x_s)$$

Generally, a goal of active learning is to minimize the expected Bayesian error $E(y|y_s; y_{L(x)}, x_s)$ overall, rather than merely maximizing the error reduction $E(y|y_{L(x)}, x_s) - E(y|y_s; y_{L(x)}, x_s)$ in each iteration. Thus, the first inequality relaxes the leftmost formula to $E(y|y_s; y_{L(x)}, x_s)$. The second inequality of formulation (2) is an application of Theorem 1.

Consequently, by minimizing the obtained Bayesian error bound of formulation (2), the most informative sample-label pair for annotation may be selected according to formulation (3) as given below:

$$(x_s^*, y_s^*) = \operatorname{argmin}_{x_s \in P, y_s \in U(x_s)} \left\{\frac{1}{2} - \frac{1}{2m}\sum_{i=1}^{m} MI(y_i; y_s \mid y_{L(x)}, x_s)\right\} \quad (3)$$

$$= \operatorname{argmax}_{x_s \in P, y_s \in U(x_s)} \sum_{i=1}^{m} MI(y_i; y_s \mid y_{L(x)}, x_s)$$

As described above in Section 2.1, example ASL embodiments implement an active learning algorithm along two dimensions, which can reduce not only sample uncertainty but also label uncertainty. The selection-strategy of formulation (3) accurately reflects these two uncertainty reduction targets. The last term of formulation (3) can be rewritten as follows:

$$\sum_{i=1}^{m} MI(y_i; y_s \mid y_{L(x)}, x_s) = MI(y_s; y_s \mid y_{L(x)}, x_s) +$$

-continued $$\sum_{i=1, i \neq s}^{m} MI(y_i; y_s \mid y_{L(x)}, x_s)$$

$$= H(y_s \mid y_{L(x)}, x_s) +$$

$$\sum_{i=1, i \neq s}^{m} MI(y_i; y_s \mid y_{L(x)}, x_s).$$

As is apparent from the formulation above, an objective selection function for ASL may be divided into two portions: $H(y_s|y_{L(x)}, x_s)$ and $$\sum_{i=1, i \neq s}^{m} MI(y_i; y_s \mid y_{L(x)}, x_s).$$

The former portion is an entropy term that measures the uncertainty of the selected pair $(x_s^*, y_s^*)$. This is consistent with a traditional active learning algorithm, i.e., to select the most uncertain samples near the classification boundary. On the other hand, the latter portion is a mutual information term that measures the statistical redundancy between the selected label and the remaining labels of a given associated sample. By maximizing these mutual information terms across samples and their associated unlabeled labels, ASL provides information for the inference of other labels to help reduce their label uncertainty. Thus, it is evident that described embodiments of the ASL strategy enable selection of the most informative sample-label pairs to reduce the uncertainties along both sample and label dimensions.

When computing the mutual information terms of formulation (3) above, the posterior distribution $P(y|x)$ is used. Although the true distribution is unknown, it can be estimated using the current state of the learner. Such an approximation is reasonable because the most useful labeling is usually consistent with the learner's prior belief over the majority (but not necessarily all) of the unlabeled pairs.

It should be understood that the posterior distribution $P(y|x)$ is usually relevant to modeling the label correlations. It can be assumed that there is independence among the different labels (e.g., $P(y|x) = \Pi_{i=1}^{m} P(y_i|x)$) and correspondingly that the mutual information term becomes $MI(y_i; y_s|y_{L(x)}, x_s) = 0, i \neq s$. In such cases, the selection criterion reduces to $(x_s^*, y_s^*) = \arg\max_{x_s \in P, y_s \in U(x_s)} H(y_s|y_{L(x)}, x_s)$, which implies that the most uncertain sample-label pair is to be selected. Such a criterion neglects the label correlations and is therefore less efficient at reducing label uncertainty. Consequently, a statistical method that can model the label correlations may be adopted. Such a Bayesian model is described in the following Section 3.

Figure 5:
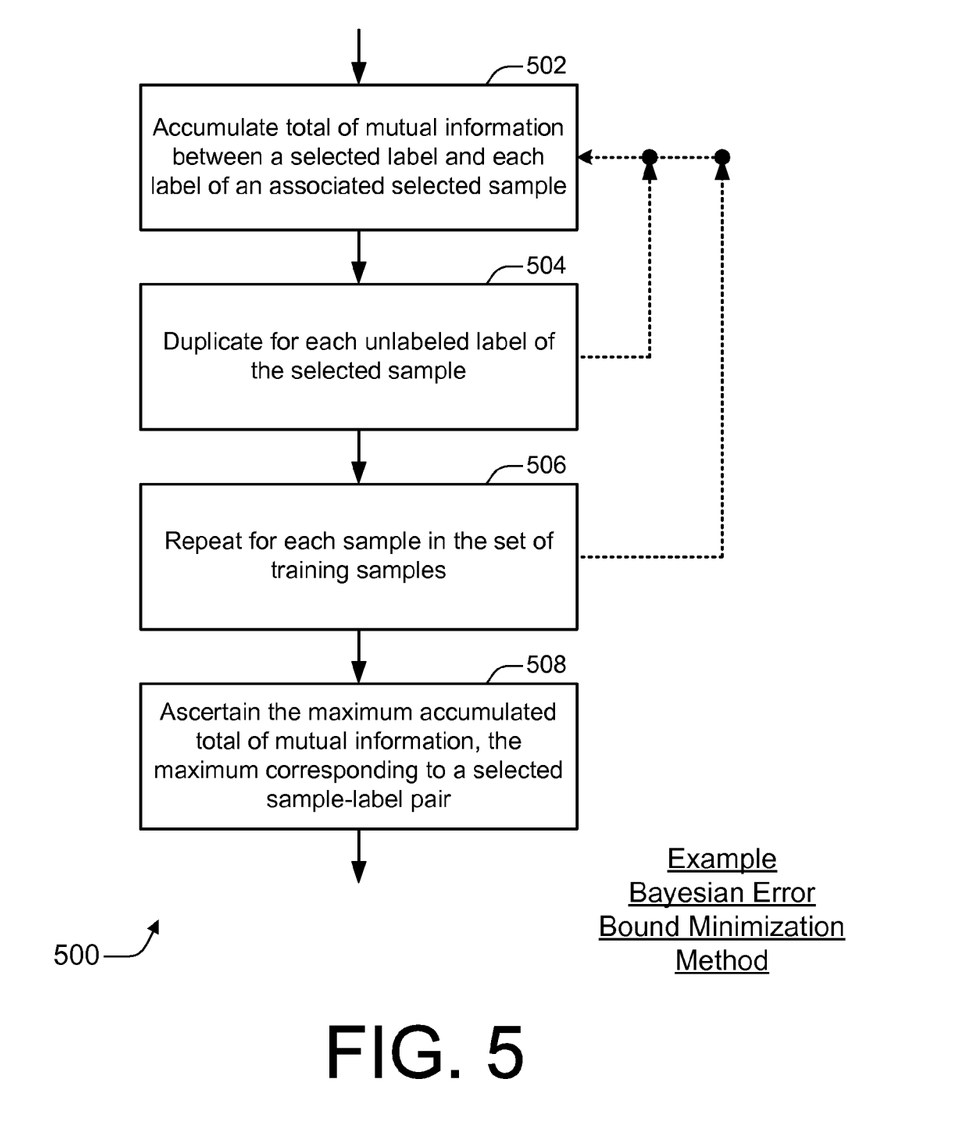
FIG. 5 is a flow diagram that illustrates an example of a method for minimizing a Bayesian error bound in multi-label active learning.

FIG. 5 is a flow diagram 500 that illustrates an example of a method for minimizing a Bayesian error bound in multi-label active learning. Embodiments of flow diagram 500 may be realized, for example, as processor-executable instructions. Flow diagram 500 includes four blocks 502-508. The method of flow diagram 500 may be used to implement at least part of formulation (3) above. By way of example, the description of flow diagram 500 includes references to other figures, such as FIG. 2.

In an example embodiment of flow diagram 500, at block 502, a mutual information total between a selected label and each label of an associated selected sample is accumulated. For example, assuming sample 106(1) is the selected sample and label 108(1)a is the selected label, the mutual information total between label 108(1)a and labels 108(1)a-108(1)c, which are associated with sample 106(1), may be accumulated.

At block 504, the mutual information total accumulation (of block 502) is duplicated for each unlabeled label of the selected sample. For example, assuming label 108(1)b is unlabeled and label 108(1)c is labeled, the mutual information total accumulation is duplicated for label 108(1)b.

At block 506, the mutual information total accumulation (of block 502) and the duplication (of block 504) is repeated for each sample in the set of training samples. For example, the mutual information total accumulation for each unlabeled label of a selected sample may be repeated for each of samples 106(2) and 106(3). The actions of blocks 502-506 result in a number of mutual information total accumulations being determined.

At block 508, from the multiple determined mutual information total accumulations, the maximum accumulated total of mutual information is ascertained. This ascertained maximum corresponds to the sample-label pair 212 that is to be selected for the next relevancy indication 214 annotation by the oracle 110.

3: Example Embodiments for an ASL-Capable Classifier

In the ASL strategies as described in Section 2 above, it is noted that a statistical model may be employed to measure label correlations. However, common multi-label classifiers, such as one-against-rest encoded binary SVM and others, address the classification of multi-labeled samples in an independent manner. Such models disregard the label correlations, and they therefore cannot be effectively implemented with ASL, at least without some measure of modification. In this Section 3, a multi-labeled Bayesian classifier is described in which the correlative relations between and among different labels are well modeled.

3.1: Example Kernelized Maximum Entropy Model (KMEM) for Classifier

The principle of a Maximum Entropy Model (MEM) is to model the known and to assume nothing about the unknown. Traditional single-label data classification suffers from the same problem as binary SVM. Although the single-labeled MEM can be extended to multi-labeled scenarios, the model is linear and does not make use of a powerful kernel method like SVM. However, MEM can be adjusted to address the difficulty that arises from incomplete labels. In this Section 3.1, MEM is first described generally and then it is extended to a nonlinear case by incorporating a kernel function into the model. This extended and kernelized MEM classification function can be used as an underlying classifier for ASL.

Let $\tilde{Q}(x,y)$, $Q(x,y)$ denote the empirical and the model distribution, respectively. The multi-label model can be obtained by solving the following formulation (4):

$$\hat{P} = \text{argmax}_P H(x, y | Q) \quad (4)$$
$$= \text{argmin}_P \langle \log P(y | x) \rangle_Q$$
$$\text{s.t.} \langle y_i \rangle_Q = \langle y_i \rangle_{\tilde{Q}} + \eta_i, \langle y_i y_j \rangle_Q$$
$$= \langle y_i y_j \rangle_{\tilde{Q}} + \theta_{ij}, 1 \le i < j \le m$$
$$\langle y_i x_l \rangle_Q = \langle y_i x_l \rangle_{\tilde{Q}} + \phi_{il}, 1 \le i \le m, 1 \le l \le d; \sum_y P(y|x) = 1$$

where $H(x,y|Q)$ is the entropy of x and y given distribution $Q$, $\langle \cdot \rangle_P$ denotes the expectation with respect to distribution P, d is the dimension of the feature vector x, and $x_l$ represents its l-th element. $\eta_i$, $\theta_{il}$ and $\phi_{il}$ are the estimation errors following the Gaussian distribution which serve to smooth the MEM to improve the model's generalization ability. By modeling the pair-wise label correlations, the resulting model can reveal the underlying label correlations.

Formulation (4) can be solved by Lagrange Multiplier algorithms, and the obtained posterior probability is $$\hat{P}(y | x) = \frac{1}{Z(x)} \exp(y^T(b + Ry + Wx)),$$

where $$Z(x) = \sum_y y^T(b + Ry + Wx)$$

is the partition function, and the parameters b, W, and R are Lagrangian multipliers that are to be determined. The optimal parameters can be found by minimizing the Lagrangian as shown below in formulation (5):

$$L(b, R, W) = \langle -\log \hat{P}(y|x) \rangle_{\tilde{Q}} + \frac{\lambda_b}{2n} \|b\|_2^2 + \quad (5)$$
$$\frac{\lambda_R}{2n} \|R\|_F^2 + \frac{\lambda_W}{2n} \|W\|_F^2$$
$$= \langle -y^T(b+Ry+Wx) + \log Z(x) \rangle_{\tilde{Q}} +$$
$$\frac{\lambda_b}{2n} \|b\|_2^2 + \frac{\lambda_R}{2n} \|R\|_F^2 + \frac{\lambda_W}{2n} \|W\|_F^2$$

where $\|.\|_F$ denotes a Frobenius norm and n is the number of samples in the training set.

The above-described multi-labeled MEM can be extended to a nonlinear model by following the idea of the imported vector machine. A transformation $\phi$ maps samples into a target space in which a kernel function $k(x', x)$ gives the inner product. The multi-labeled MEM can be rewritten as $$\hat{P}(y|x) = \frac{1}{Z(x)} \exp(y^T(b+Ry) + y^T k(W, x)).$$

According to the Representer Theorem, the optimal weighting vector of the single-labeled problem is a linear combination of samples. In a multi-labeled setting, the mapped weighting matrix $\phi(W)$ can still be written as a linear combination of $\phi(x_i)$ except that the combination coefficients are vectors instead of scalars.

This vector approach is shown below by formulation (6):

$$\phi(W) = \sum_{i=1}^n \theta(x_i) \phi^T(x_i) \quad (6)$$

-continued $$= [\theta(x_1) \; \theta(x_2) \; \ldots \; \theta(x_n)] \begin{bmatrix} \phi^T(x_1) \\ \phi^T(x_2) \\ \vdots \\ \phi^T(x_n) \end{bmatrix}$$

$$= \Theta \cdot \begin{bmatrix} \phi^T(x_1) \\ \phi^T(x_2) \\ \vdots \\ \phi^T(x_n) \end{bmatrix}$$

where the summation is taken over the samples in the training set, $f(x_i)$ is an m×1 coefficient vector, and $\Theta$ is an m×n matrix in which each row is the weighting coefficients for each label. Accordingly, formulation (7) results:

$$K(W, x) = \phi(W) \cdot \phi(x) \quad (7)$$
$$= \Theta \cdot [k(x_1, x) \; \ldots \; k(x_n, x)]^T$$
$$= \Theta \cdot k(x)$$

$$\hat{P}(y \mid x) = \frac{1}{Z(x)} \exp(y^T(b + Ry) + y^T k(W, x))$$
$$= \frac{1}{Z(x)} \exp(y^T(b + Ry + \Theta k(x)))$$

where $k(x)=[K(x_1,x) \ldots K(x_n,x)]^T$ is an n×1 vector. It can be considered as a new representation of sample x. Correspondingly, with the identity $\|\phi(W)\|_F^2 = tr(\phi(W)\phi(W)^T) = tr(\Theta K\Theta^T)$, the Lagrangian function of formulation (4) can be rewritten as shown below by formulation (8):

$$L(b, R, \Theta) = \left\langle -\log \hat{P}(y \mid x) \right\rangle_Q + \frac{\lambda_b}{2n} \|b\|_2^2 + \frac{\lambda_R}{2n} \|R\|_F^2 + \frac{\lambda_W}{2n} tr(\Theta K \Theta^T) \quad (8)$$

where $K=[k(x_i,x_j)]_{n \times n}$ is the kernel matrix. This model is termed herein the Kernelized Maximum Entropy Model (KMEM). By minimizing formulation (7), the optimal parameters may be estimated for KMEM.

3.2: Example Expectation Maximization (EM) Algorithm for Classifier

An EM algorithm can be applied in statistics generally for finding maximum likelihood estimates of parameters in probabilistic models, where the model depends on unobserved latent variables. Typical EM implementations alternate between performing an expectation (E) step and a maximization (M) step. The E-step computes an expectation of the likelihood by including the latent variables as if they were observed. The M-step computes the maximum likelihood estimates of the parameters by maximizing the expected likelihood found on the E-step. The parameters found with the M-step are then used to begin another E-step, and the process is repeated.

An EM algorithm can be adapted for the classifier and implemented to handle the incomplete labeling resulting from ASL. Given that the training set constructed by ASL is partially unlabeled, the incomplete labels can be accommodated by integrating out the unlabeled part to yield the marginal distribution of the labeled part $$\hat{P}(y_{L(x)} \mid x) = \sum_{y_{U(x)}} \hat{P}(y_{U(x)}, y_{L(x)} \mid x).$$

After substituting it for $\hat{P}(y|x)$ in formulation (7), the following formulation (9) is obtained:

$$L(b, R, \Theta) = \tag{9}$$
$$\left\langle -\log \sum_{y_{U(x)}} \hat{P}(y_{U(x)}, y_{L(x)} \mid x) \right\rangle_Q + \frac{\lambda_b}{2n} \|b\|_2^2 + \frac{\lambda_R}{2n} \|R\|_F^2 + \frac{\lambda_W}{2n} tr(\Theta K \Theta^T)$$

By minimizing formulation (8), the optimal parameters for KMEM may be obtained. However, it is mathematically difficult to minimize it directly. Instead, an Expectation Maximization (EM) algorithm may be used to solve this optimization problem. An example implementation of the EM algorithm is described below in terms of an expectation step (E-Step) and a maximization step (M-Step).

E-Step: Given the current t-th step parameter estimation $b_t, R_t, \Theta_t$, the Q-function (i.e., the expectation of the Lagrangian formulation (8) under the current parameters given the labeled part) can be written as provided by formulation (10) below:

$$Q(b, R, \Theta \mid b_t, R_t, \Theta_t) = \tag{10}$$
$$\left\langle -E_{U(x)|L(x);b_t,R_t,\Theta_t} \log \hat{P}(y_{U(x)}, y_{L(x)} \mid x; b, R, \Theta) \right\rangle_Q +$$
$$\frac{\lambda_b}{2n} \|b\|_2^2 + \frac{\lambda_R}{2n} \|R\|_F^2 + \frac{\lambda_W}{2n} tr(\Theta K \Theta^T)$$

where $E_{U(x)|L(x);b_t,R_t,\Theta_t}$ is the expectation operator given the current estimated conditional probability $\hat{P}(y_{U(x)}|y_{L(x)},x;b_t,R_t,\Theta_t)$.

M-Step: The parameters are updated by minimizing the Q-function as shown below in formulation (11):

$$b_{t+1}, R_{t+1}, \Theta_{t+1} = \operatorname{argmin}_{b,R,\Theta} Q(b,R,\Theta \mid b_t, R_t, \Theta_t) \tag{11}$$

The derivatives of the Q-function with respect to its parameters b, R, $\Theta$ are provided by formulation (12):

$$\frac{\partial Q}{\partial b_i} = \langle y_i \rangle_Q - \langle E_{y_i|L(x);b,R,\Theta} y_i \rangle_Q + \frac{\lambda_b}{n} b_i, \; \frac{\partial Q}{\partial R_{ij}} \tag{12}$$
$$= \langle y_i y_j \rangle_Q - \langle E_{y_i,y_j|L(x);b,R,\Theta} y_i y_j \rangle_Q + \frac{\lambda_R}{n} R_{ij}, \; \frac{\partial Q}{\partial \Theta_{il}}$$
$$= \langle y_i k(x_l, x) \rangle_Q - \langle E_{y_i,y_l|L(x);b,R,\Theta} y_i k(x_l, x) \rangle_Q +$$
$$\frac{\lambda_W}{n} \sum_{k=1}^{n} \Theta_{ik} k(x_k, x_l)$$

Given the above derivatives, an efficient gradient descent method can be used to minimize formulation (10).

As described above, an implementation of the EM algorithm is applied to handle the partial labeling resulting from ASL embodiments. In formulation (10) for the E-step, the expectation of the complete log-likelihood function $-\log \hat{P}(y_{U(x)}, y_{L(x)} | x; b, R, \Theta)$ is computed under the unlabeled part distribution $P(U(x)|L(x); b_t, R_t, \Theta_t)$. For formulation (11) of the M-step, it computes the maximum likelihood estimates of the parameters by maximizing the expected likelihood of formulation (10) of the E-step. Formulation (12) of the M-step gives the derivatives of the objective function to be maximized, so that an optimization algorithm based on these derivatives can be adopted.

4: Example Embodiments for a Multi-Label Active Learning System

Figure 6:
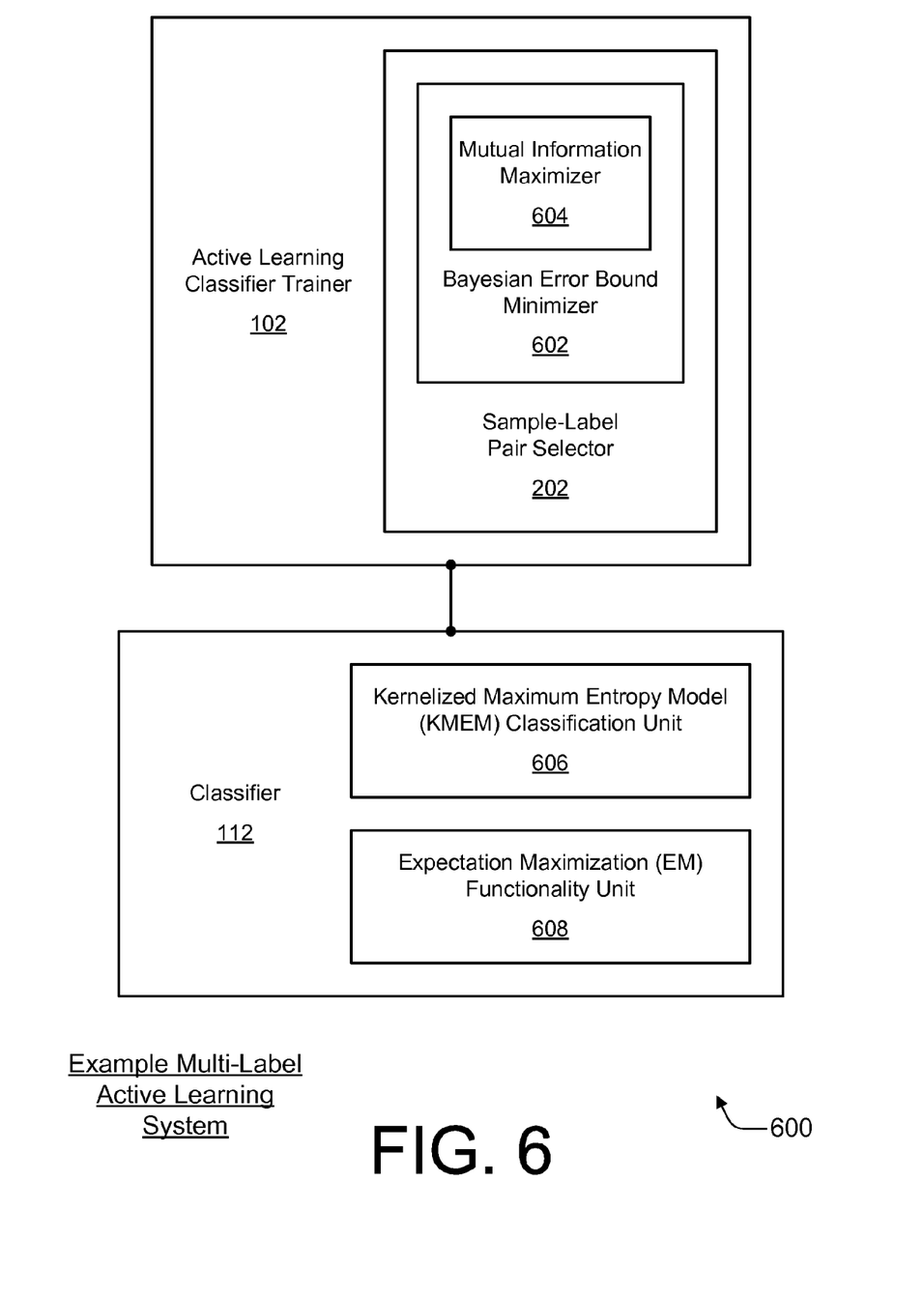
FIG. 6 is a block diagram of an example multi-label active learning system that includes an active learning classifier trainer and a related classifier.

FIG. 6 is a block diagram of an example multi-label active learning system 600 that includes an active learning classifier trainer 102 and a related classifier 112. As illustrated, active learning classifier trainer 102 includes a sample-label pair selector 202. Sample-label pair selector 202 includes a Bayesian error bound minimizer 602, which includes a mutual information maximizer 604. Classifier 112 includes a kernelized maximum entropy model (KMEM) classification unit 606 and an expectation maximization (EM) functionality unit 608.

In an example embodiment, classifier 112 is to classify objects in accordance with multiple labels that are also associated with samples of a set of training samples 104 (of FIGS. 1 and 2). Sample-label pair selector 202 analyzes the set of training samples 104 and selects a sample-label pair 212 (of FIG. 2) responsive to at least one error parameter. Active learning classifier trainer 102 submits the selected sample-label pair 212 to an oracle 110 (of FIGS. 1 and 2) for labeling and receives from the oracle a relevancy indication 214 (of FIG. 2) for the selected sample-label pair 212. Active learning classifier trainer 102 also adds the relevancy indication 214 to the set of training samples 104 at the selected sample-label pair 212 so as to update the set of training samples 104. Active learning classifier trainer 102 updates the classifier 112 using the updated set of training samples.

Bayesian error bound minimizer 602 minimizes a Bayesian error bound when selecting the sample-label pair 212, such as is described herein above with particular reference to formulation (3). Mutual information maximizer 604 maximizes, or at least increases, the mutual information between (i) a particular label 108 that is associated with a particular sample 106 of the multiple samples 106 of the set of training samples 104 and (ii) each label 108 that is associated with the particular sample 106.

Kernelization enables a mapping from a lower dimensional space to a higher dimensional space (e.g., from 100s to 1000s of dimensions). Implementing kernelization with a classifying algorithm enables a linear approach in the kernelized space to realize a non-linear classification function. In an example embodiment, KMEM classification unit 606 uses a linear classification algorithm in kernelized space while realizing a corresponding non-linear classification function for classifier 112 to account for correlations among the multiple labels 108. EM functionality unit 608 handles the labels 108 of the set of training samples 104 that are not assigned a relevancy indication 214 during the classifier learning process. Example embodiments for KMEM classification unit 606 and EM functionality unit 608 are described further herein above in Section 3.2.

5: Example Device Implementations for Multi-Label Active Learning

Figure 7:
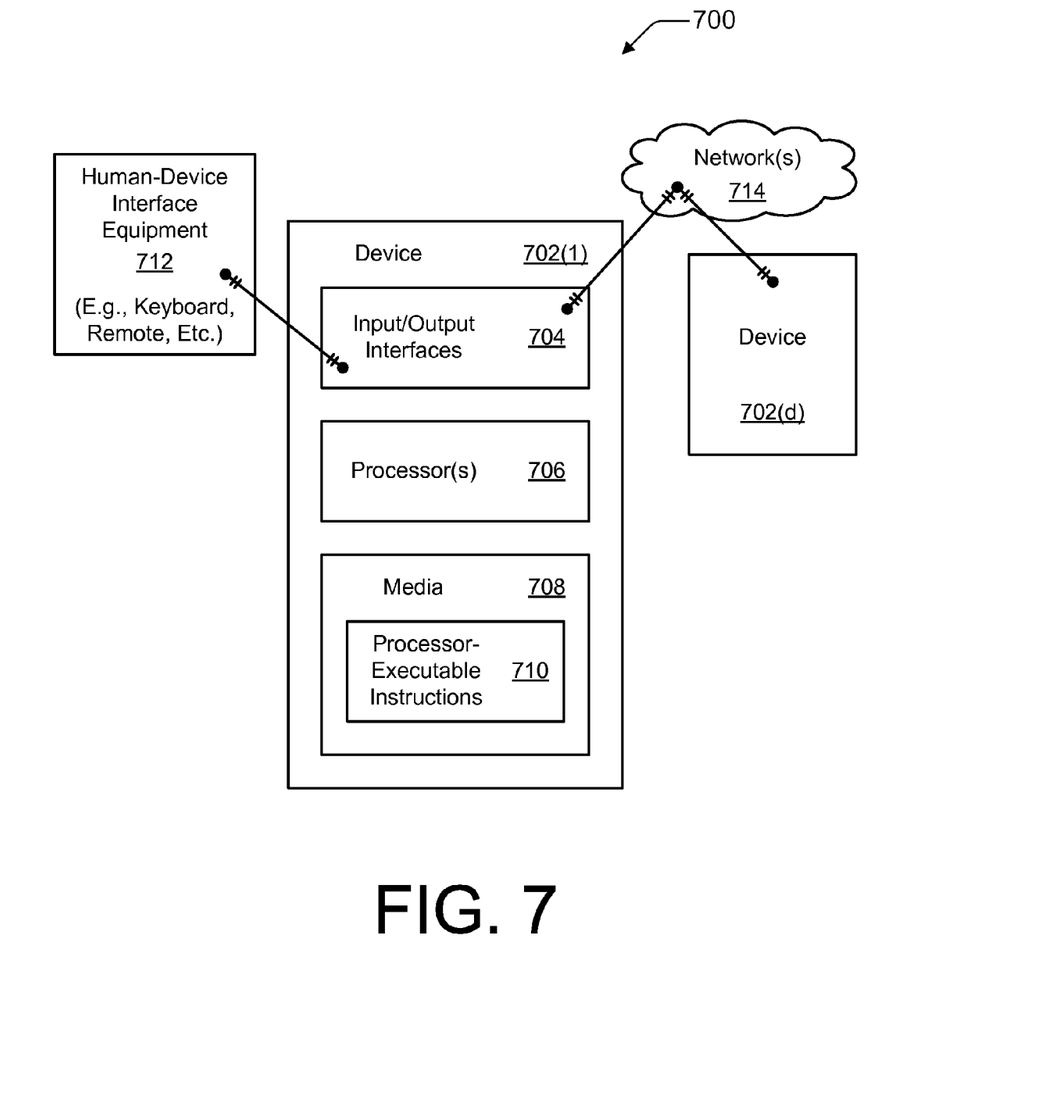
FIG. 7 is a block diagram of an example device that may be used to implement multi-label active learning.

FIG. 7 is a block diagram 700 of an example device 702 that may be used to implement multi-label active learning. As illustrated, two devices 702(1) and 702(d) are capable of engaging in communications via network(s) 714. Although two devices 702 are specifically shown, one or more than two devices 702 may be employed, depending on implementation. Network(s) 714 may be, by way of example but not limitation, an internet, an intranet, an Ethernet, a public network, a private network, a cable network, a digital subscriber line (DSL) network, a telephone network, a Fibre network, a Grid computer network, a wired network, an infrastructure or ad hoc wireless network, a cellular network, a mesh network, a peer-to-peer (P2P) network, an avenue to connect to any such network, some combination thereof, and so forth.

Generally, a device 702 may represent any computer or processing-capable device, such as a server device; a workstation or other general computing device; a data storage repository apparatus; a personal digital assistant (PDA); a mobile phone; a gaming platform; an entertainment device; a router computing node; a mesh or other network node; a wireless access point; some combination thereof; and so forth. As illustrated, device 702 includes one or more input/output (I/O) interfaces 704, at least one processor 706, and one or more media 708. Media 708 include processor-executable instructions 710.

In an example embodiment of device 702, I/O interfaces 704 may include (i) a network interface for communicating across network 714, (ii) a display device interface for displaying information on a display screen, (iii) one or more human-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, a screen, and so forth. Examples of (iii) human-device interfaces include those that communicate by wire or wirelessly to human-device interface equipment 712 (e.g., a keyboard, a remote, a mouse or other graphical pointing device, etc.) as well as a speaker, microphone, and so forth.

Generally, processor 706 is capable of executing, performing, and/or otherwise effectuating processor-executable instructions, such as processor-executable instructions 710. Media 708 is comprised of one or more processor-accessible media. In other words, media 708 may include processor-executable instructions 710 that are executable by processor 706 to effectuate the performance of functions by device 702. Processor-executable instructions may be embodied as software, firmware, hardware, fixed logic circuitry, some combination thereof, and so forth.

Thus, realizations for multi-label active learning may be described in the general context of processor-executable instructions. Generally, processor-executable instructions include routines, programs, applications, coding, modules, protocols, objects, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 706 may be implemented using any applicable processing-capable technology, and one may be realized as a general purpose processor (e.g., a central processing unit (CPU), a microprocessor, a controller, etc.), a graphics processing unit (GPU), a special-purpose processor, a derivative or combination thereof, and so forth. Media 708 may be any available media that is included as part of and/or accessible by device 702. It includes volatile and non-volatile media, removable and non-removable media, storage and transmission media (e.g., wireless or wired communication channels), hard-coded logic media, combinations thereof, and so forth. Media 708 is tangible media when it is embodied as a manufacture and/or as a composition of matter. For example, media 708 may include an array of disks or flash memory for longer-term mass storage of processor-executable instructions 710, random access memory (RAM) for shorter-term storing of instructions that are currently being executed and/or otherwise processed, link(s) on network 714 for transmitting communications, and so forth.

As specifically illustrated, media 708 comprises at least processor-executable instructions 710. Generally, processor-executable instructions 710, when executed by processor 706, enable device 702 to perform the various functions described herein. Such functions include, but are not limited to: (i) those acts that are illustrated in flow diagrams 400 and 500 (of FIGS. 4 and 5); (ii) those acts that are performable by the components of FIGS. 1, 2, and 6); (iii) those acts that are performed to implement ASL 300 (of FIG. 3); (iv) those acts that are performed to implement the algorithms and formulations (e.g., formulations (3), (10), (11), (12), etc.) that are described herein; combinations thereof; and so forth.

The devices, acts, aspects, features, functions, procedures, components, techniques, algorithms, etc. of FIGS. 1-7 are illustrated in diagrams that are divided into multiple blocks and other elements. However, the order, interconnections, interrelationships, layout, etc. in which FIGS. 1-7 are described and/or shown are not intended to be construed as a limitation, and any number of the blocks and/or other elements can be modified, combined, rearranged, augmented, omitted, etc. in any manner to implement one or more systems, methods, devices, procedures, media, apparatuses, arrangements, etc. for multi-label active learning.

Although systems, media, devices, methods, procedures, apparatuses, mechanisms, schemes, approaches, processes, arrangements, and other example embodiments have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claimed invention.

What is claimed is:

1. A method for multi-label active learning, the method comprising:
   under control of one or more processors configured with processor-executable instructions:
   accepting a set of training samples, the set of training samples including multiple respective samples that are each respectively associated with multiple labels;
   analyzing the set of training samples;
   selecting a sample from the set of training samples and a label from the multiple labels to form a sample-label pair responsive to at least one error parameter; and
   submitting the selected sample-label pair to an oracle for labeling.

2. The method as recited in claim 1, further comprising:
   receiving from the oracle a relevancy indication for the selected sample-label pair;
   adding the relevancy indication to the set of training samples at the selected sample-label pair to update the set of training samples; and
   updating a classifier using the updated set of training samples.

3. The method as recited in claim 2, further comprising:
   iteratively repeating the steps of analyzing, submitting, receiving, adding, and updating until a predetermined criterion is satisfied;
   wherein the repeated step of analyzing comprises analyzing the updated set of training samples to select another sample-label pair responsive to the at least one error parameter.

4. The method as recited in claim 2, wherein the selected sample-label pair comprises a selected sample and a selected label that is associated with the selected sample; and wherein the relevancy indication comprises a positive indication that the selected label is conceptually applicable to the selected sample or a negative indication that the selected label is not conceptually applicable to the selected sample.

5. The method as recited in claim 2, further comprising:
   implementing a kernelized maximum entropy model (KMEM) for the classifier so as to use a linear classification algorithm in kernelized space while actually realizing a corresponding non-linear classification function in the classifier to account for correlations among labels.

6. The method as recited in claim 2, wherein the step of updating the classifier comprises:
   implementing an expectation-maximization (EM) algorithm to handle labels of the set of training samples that are not assigned a relevancy indication.

7. The method as recited in claim 1, wherein the at least one error parameter comprises a Bayesian error bound.

8. The method as recited in claim 7, wherein the step of analyzing the set of training samples to select the sample-label pair comprises:
   selecting the sample-label pair responsive to a process involving a minimization of the Bayesian error bound.

9. The method as recited in claim 8, wherein the step of selecting the sample-label pair responsive to the process involving the minimization of the Bayesian error bound comprises:
   selecting the sample-label pair responsive to a process involving a maximization of mutual information between (i) a particular label associated with a particular sample of the multiple samples of the set of training samples and (ii) each label that is associated with the particular sample.

10. The method as recited in claim 1, wherein the at least one error parameter comprises a generalization error; and wherein the step of analyzing the set of training samples to select the sample-label pair responsive to the at least one error parameter comprises:
    selecting the sample-label pair based on mutual information among the multiple labels so as to reduce the generalization error.

11. The method as recited in claim 1, wherein the selected sample-label pair comprises a selected sample and a selected label that is associated with the selected sample; and wherein the step of analyzing the set of training samples to select the sample-label pair responsive to the at least one error parameter comprises:
    selecting the sample-label pair responsive to (i) an entropy measure that reflects an uncertainty of the selected sample-label pair and (ii) a mutual information measure that reflects a statistical redundancy between the selected label and other labels that are also associated with the selected sample.

12. The method as recited in claim 1, wherein the selected sample-label pair comprises a selected sample and a selected label that is associated with the selected sample; and wherein the step of analyzing the set of training samples to select the sample-label pair responsive to the at least one error parameter comprises:
    selecting the sample-label pair responsive to correlative relationships between the selected label and other labels that are also associated with the selected sample.

13. The method as recited in claim 1, wherein the multiple respective samples of the set of training samples includes a particular sample; and the multiple labels include first, second, and third particular labels that are each associated with the particular sample; wherein each of the first, second, and third particular labels are unlabeled; and wherein the selected sample-label pair comprises the particular sample and the second particular label while omitting the first and third particular labels.

14. The method as recited in claim 1, wherein the step of analyzing the set of training samples to select the sample-label pair responsive to the at least one error parameter comprises:
- accumulating a total of mutual information between a selected label and each label that is associated with a selected sample;
- duplicating the accumulating for each unlabeled label that is associated with the selected sample;
- repeating the accumulating and the duplicating for each sample of the multiple samples of the set of training samples to determine multiple mutual information accumulation totals; and
- from the steps of accumulating, duplicating, and repeating, ascertaining a maximum mutual information accumulation total from the multiple mutual information accumulation totals so as to select the sample-label pair responsive to the at least one error parameter.

15. One or more memory comprising processor-executable instructions that, when executed, direct a device to perform acts for multi-label active learning, the acts comprising:
- accepting a set of training samples, the set of training samples including multiple respective samples that are each respectively associated with multiple labels;
- analyzing the set of training samples to select a sample-label pair based on mutual information among the multiple labels so as to reduce a classification error parameter, the selected sample-label pair comprising a selected sample and a selected label that is associated with the selected sample;
- submitting the selected sample-label pair to an oracle for labeling;
- receiving from the oracle a relevancy indication for the selected sample-label pair;
- adding the relevancy indication to the set of training samples at the selected sample-label pair to update the set of training samples, the relevancy indication comprising a positive indication that the selected label is conceptually applicable to the selected sample or a negative indication that the selected label is not conceptually applicable to the selected sample; and
- updating a classifier using the updated set of training samples.

16. A device for multi-label active learning, the device comprising:
- one or more processors; and
- memory having stored therein:
    - a set of training samples including multiple respective samples that are each respectively associated with multiple labels;
    - a classifier, executable on the one or more processors, to classify objects in accordance with the multiple labels; and
    - an active learning classifier trainer including a sample-label pair selector, executable on the one or more processors, to analyze the set of training samples and to select a sample from the set of training samples and a label from the multiple labels to form a sample-label pair responsive to at least one error parameter; the
    - active learning classifier trainer to submit the selected sample-label pair to an oracle, for labeling and to receive from the oracle a relevancy indication for the selected sample-label pair;
    - the active learning classifier trainer to add the relevancy indication to the set of training samples at the selected sample-label pair so as to update the set of training samples; and
    - the active learning classifier trainer to update the classifier using the updated set of training samples.

17. The device as recited in claim 16, wherein the at least one error parameter comprises a Bayesian error bound; and wherein the sample-label pair selector comprises:
- a Bayesian error bound minimizer to minimize the Bayesian error bound when selecting the sample-label pair.

18. The device as recited in claim 17, wherein the Bayesian error bound minimizer comprises:
- a mutual information maximizer to maximize mutual information between (i) a particular label associated with a particular sample of the multiple samples of the set of training samples and (ii) each label that is associated with the particular sample.

19. The device as recited in claim 16, wherein the classifier comprises:
- a kernelized maximum entropy model (KMEM) classification unit to use a linear classification algorithm in kernelized space while realizing a corresponding non-linear classification function for the classifier to account for correlations among the multiple labels.

20. The device as recited in claim 16, wherein the classifier comprises:
- an expectation-maximization (EM) functionality unit to handle labels of the set of training samples that are not assigned a relevancy indication during the classifier learning.

* * * * *